United States Patent
Albright et al.

(10) Patent No.: US 12,479,527 B2
(45) Date of Patent: Nov. 25, 2025

(54) TRAILER FOR MANURE PUMP

(71) Applicant: BAZOOKA-FARMSTAR, LLC, Washington, IA (US)

(72) Inventors: Jason Albright, Wellman, IA (US); Joel Sutter, Coralville, IA (US); Phillip Minino, Washington, IA (US)

(73) Assignee: Bazooka-Farmstar, LLC, Washington, IA (US)

(*) Notice: Subject to any disclaimer, the term of this patent is extended or adjusted under 35 U.S.C. 154(b) by 500 days.

(21) Appl. No.: 18/146,803

(22) Filed: Dec. 27, 2022

(65) Prior Publication Data
US 2023/0210045 A1  Jul. 6, 2023

Related U.S. Application Data

(60) Provisional application No. 63/296,265, filed on Jan. 4, 2022.

(51) Int. Cl.
*B62D 63/06* (2006.01)
*B60D 1/01* (2006.01)
*A01C 3/06* (2006.01)

(52) U.S. Cl.
CPC ............ *B62D 63/061* (2013.01); *B60D 1/01* (2013.01); *A01C 3/06* (2013.01)

(58) Field of Classification Search
CPC .................................................. B62D 63/061
See application file for complete search history.

(56) References Cited

U.S. PATENT DOCUMENTS

| | | | | |
|---|---|---|---|---|
| 4,594,006 | A * | 6/1986 | Depeault | A01C 3/026 417/900 |
| 5,100,303 | A * | 3/1992 | Depault | A01C 3/026 417/361 |
| 5,624,241 | A * | 4/1997 | Nesseth | E04G 21/0436 417/430 |
| 6,520,750 | B2 * | 2/2003 | Eller | E03B 3/04 417/361 |
| 8,939,637 | B2 * | 1/2015 | Depault | A01C 3/026 417/900 |
| 11,678,603 | B2 * | 6/2023 | Bambauer | A01C 23/008 239/159 |
| 2020/0391643 | A1 * | 12/2020 | Sweeney | B60P 1/16 |
| 2021/0262471 | A1 * | 8/2021 | Ramlall | F04D 13/021 |
| 2025/0042320 | A1 * | 2/2025 | Jarvis | B60P 1/162 |

FOREIGN PATENT DOCUMENTS

GB  2585637 A * 1/2021 ............. B60P 1/433

* cited by examiner

*Primary Examiner* — Kevin Hurley
(74) *Attorney, Agent, or Firm* — Merchant & Gould P.C.

(57) ABSTRACT

An example trailer for a pump can include: a folding system including a first member and a second member that are pivotally connected to one another at a pivot point; a mechanism positioned to move the first member relative to the second member from a transport mode to an operating mode; a ground support system configured to support the trailer relative to a ground; and a guide member configured to hold the pump.

14 Claims, 11 Drawing Sheets

TRAILER FOR MANURE PUMP

BACKGROUND

Power Take-off (PTO) driven manure pumps are powered by a tractor PTO and are attached to the back of a tractor. The pump is connected to the tractor PTO via a PTO shaft that transfers power to the pump. Manure pumps are used to agitate liquid manure in a pit or to pump the manure into a tank pulled by a vehicle for transport and application in an agricultural field to add nutrients to the soil. It can also be used as a feed pump for dragline systems or any liquid transfer applications.

Manure pumps are often transported between sites that are sometimes a long distance apart. Often, particularly when travelling a long distance, it is desirable to use a trailer-type PTO driven pump, as opposed to a 3-point mounted pump, because the trailer-type PTO driven pump can be attached quickly behind a higher speed vehicle and transported to a site and is easy to hook up to a tractor once at the site. Trailer-mounted pumps can be easier to position and lower into the opening of a manure pit due to an up and down sliding motion as compared to the complicated geometry of the 2-point or 3-point mounted pumps.

Presently PTO trailer pump configurations lay the pump horizontally during transport and tip up at the back or pivot around the axle to then slide down into the opening of the manure pit. This configuration requires a very long trailer and either an extremely long PTO shaft, or multiple PTO shafts. Due to its length, the trailer is challenging to back into position, especially depending upon the configuration of the pumping site.

The length of the trailer also makes it difficult for the operator to see what is happening in the manure pit opening because of the distance from the tractor. Often there is minimal space around the opening to the manure pit as well as multiple pieces of equipment around the job site which are difficult to maneuver around. Further, the geometry of the trailer units can make it awkward to attach the PTO shaft between the tractor and the gear box. When two PTO shafts are needed, an additional carrier bearing system is required to support and connect the PTO shafts. These add cost and maintenance requirements.

SUMMARY

The present disclosure is directed to a trailer for a manure agitator pump and, more particularly, a trailer for a Power Take-off (PTO) driven manure pump.

In one aspect, an example trailer for a pump can include: a folding system including a first member and a second member that are pivotally connected to one another at a pivot point; a mechanism positioned to move the first member relative to the second member from a transport mode to an operating mode; a ground support system configured to support the trailer relative to a ground; and a guide member configured to hold the pump.

DETAILED DESCRIPTION

The present disclosure is directed to a trailer for a manure pump and, more particularly, a trailer for a Power Take-off (PTO) driven manure pump.

Referring to FIGS. 1-4, an example trailer 10 for use with a PTO driven manure pump and supporting structure includes a hitch 14, a tongue 16, a folding system 18, a ground support system 20, and a guide member 22.

The hitch 14 is of any size shape and structure. In the example shown, the hitch 14 includes a pair of horizontally spaced connecting members 24 and 26 with each having apertures 28 that are vertically aligned. A vehicle connecting member (not shown) of a transport vehicle is received between the connecting members 24 and 26. The vehicle connecting member would have an aperture that aligns with the apertures 28 to receive a locking pin (not shown). Also, in the example shown, the hitch 14 is offset in relation to the tongue 16 to allow easier access for installation and removal of the PTO shaft.

The tongue 16 has a first member 30 and a second member 32 that are pivotally connected to one another at a pivot point 34. A first end 36 of the first member 30 is connected to the hitch 14 and, in the example shown, is curved and/or angled to create the offset position. The second member 32 extends from the pivot point 34.

In the example shown, the folding system 18 includes a hydraulic cylinder 40 and a cylinder support member 42. The hydraulic cylinder 40 is connected to the first member 30 of the tongue 16 between the first end 36 and the pivot point 34 and extends to a first end 44 of the cylinder support member 42. In the example shown, the cylinder support member 42 extends downwardly from the second member 32 and is curved and/or angled toward the first member 30.

The ground support system 20 includes a support member 48 connected at a first end 50 to a transverse axle 52. Rotatably connected to each end of the axle 52 are wheels 54. In the example shown, attached to the second end 56 of the support member 48 is the guide member 22.

The manure pump 12 is slidably connected to the guide member 22. In one example, a pair of slide blocks or pads 58 are bolted to an inner surface of the guide member 22 that frictionally engages a vertical I-beam 60 of the pump 12. Also connected to the pump 12 is a hydraulic cylinder 62 for lifting and lowering the pump 12 in conjunction with the guide member 22.

Figure 5:
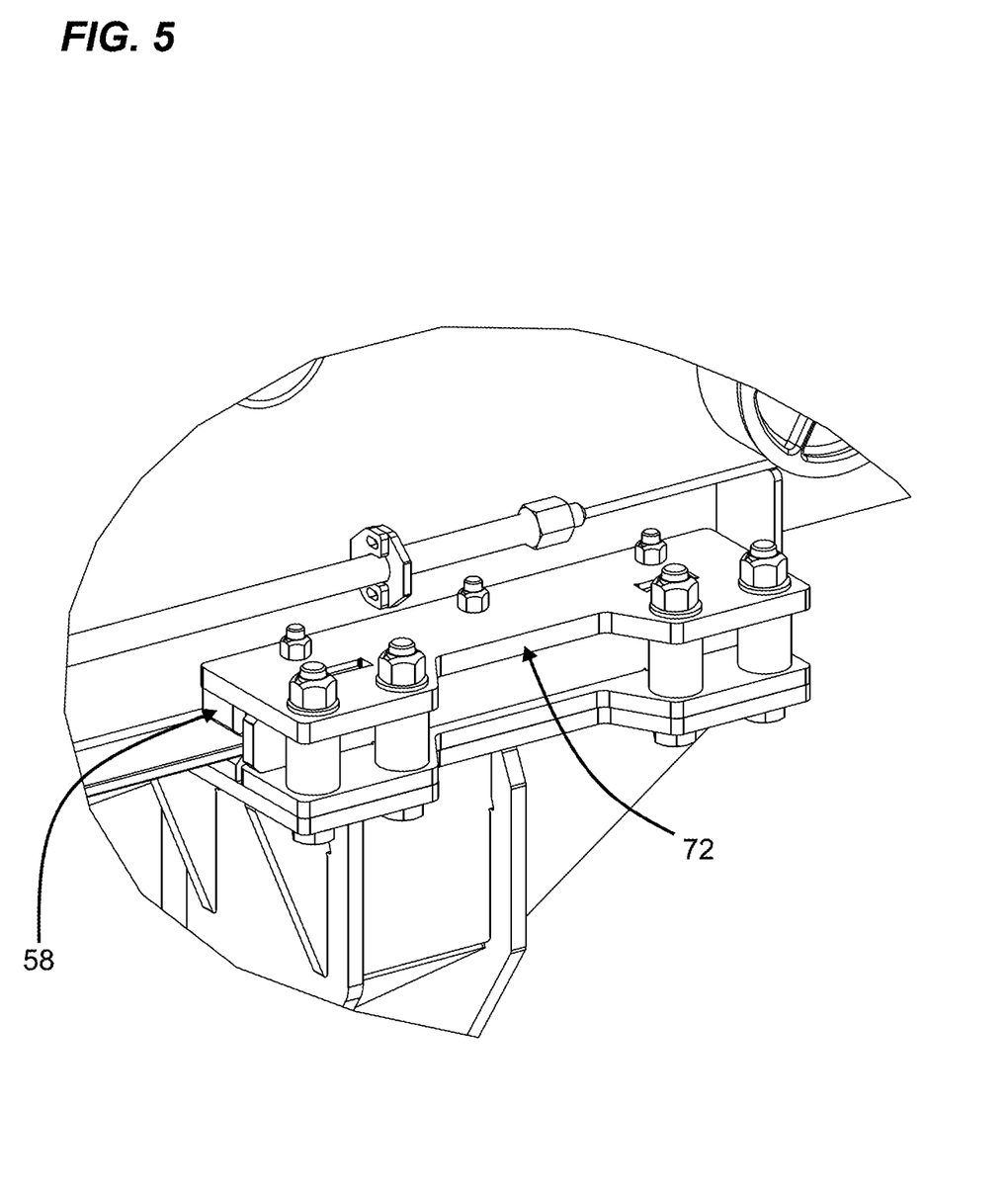
FIG. 5 shows an enlarged view of a portion of the trailer of FIG. 1.

In this instance shown in FIG. 5, the pump body engages the trailer body with the I-beam 60 on the pump body. The trailer body can have an external plastic plate that upon which the outside of the I-beam 60 sits. Two clamp pieces 72 are bolted to the trailer body. The clamp pieces 72 have a plastic block backed by steel, such as the pads 58 of FIG. 5, extending out to engage the inner surface of the I-beam 60 on either side. The clamps 72 prevent the pump from shifting side to side and front to back. The slide plates are replaceable if they are worn down. The plastic reduces the need to grease the slide mechanism by reducing friction with the I-beam 60. The I-beam 60 could be replaced with a channel, tubes with an enclosure mechanism, or similar concepts.

The clamps 72 may not create enough friction to prevent a sliding motion. They limit the pump body to one degree of freedom, which is in the vertical translation direction in operating mode, from a lifted position to a lowered position for pumping. The hydraulic cylinder 62 causes the lift or lowering motion of the pump body 12 and prevents motion in the vertical direction when in operating mode unless hydraulic oil is supplied to the cylinder 62. The motion and restriction of motion in the single degree of freedom could also be accomplished with a motor and chain system, a rack and pinion system, a winch system with cables or other mechanical systems. The motion system could be powered by hydraulics, electricity, a manual crank, pneumatics, or other power systems.

In example embodiments, the manure pump 12 can be of any type and include a centrifugal pump having one (or more) outlets. This can include, without limitation, mixed flow and axial flow pumps. The pump 12 is preferably submersible but may also be non-submersible and may be reversible to draw liquid in as well as expel liquid.

In the specific example shown, the pump 12 is a single outlet pump for manure with impeller openings meant for high volume/low pressure pumping. However, in alternative embodiments, different types of pumps of any kind with any number of outlets could be used. In example embodiments, the manure pump 12 can include a propellor, auger, and/or other fluid-moving device.

Figure 1:
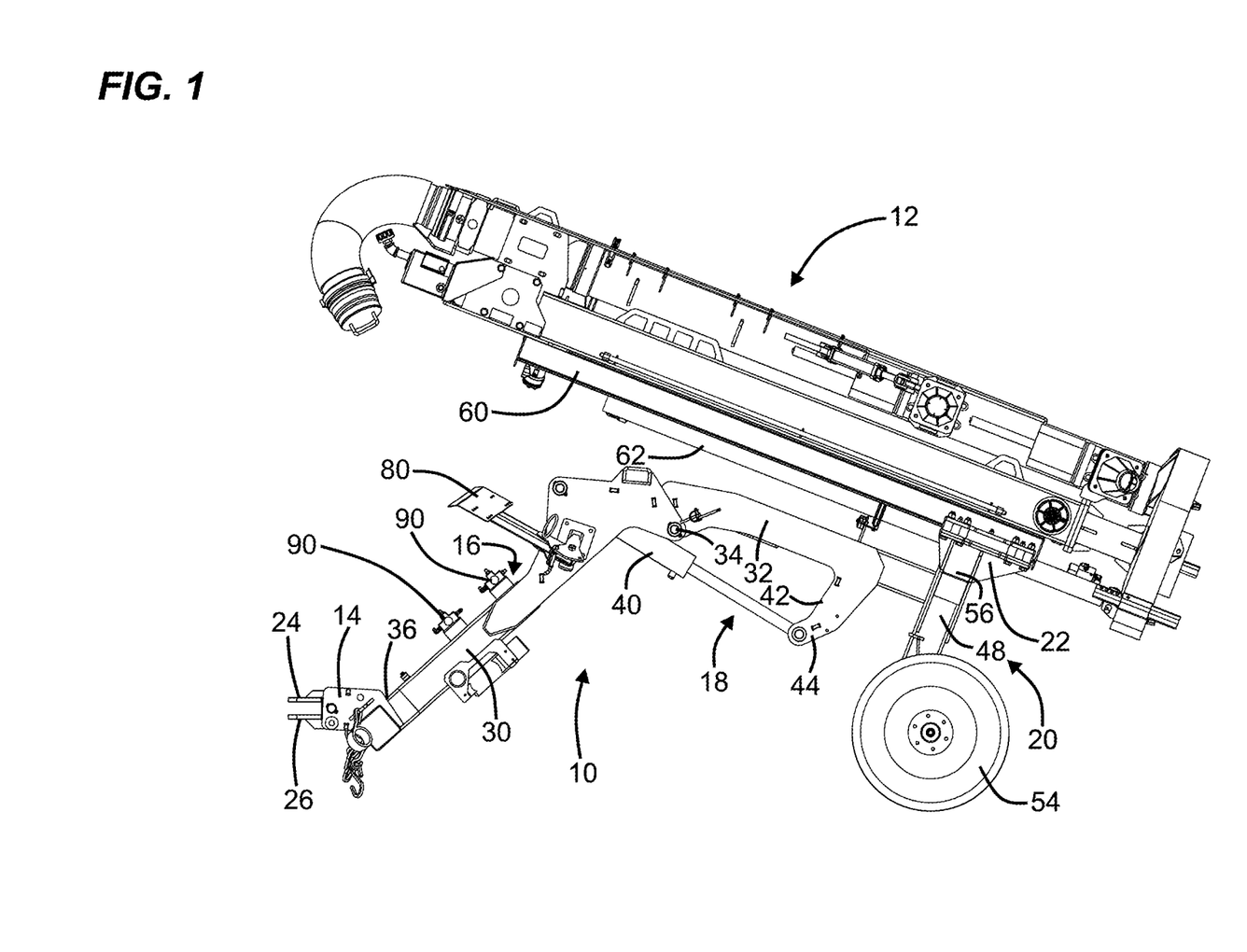
FIG. 1 shows an example trailer with a manure pump in a transport mode.
Figure 2:
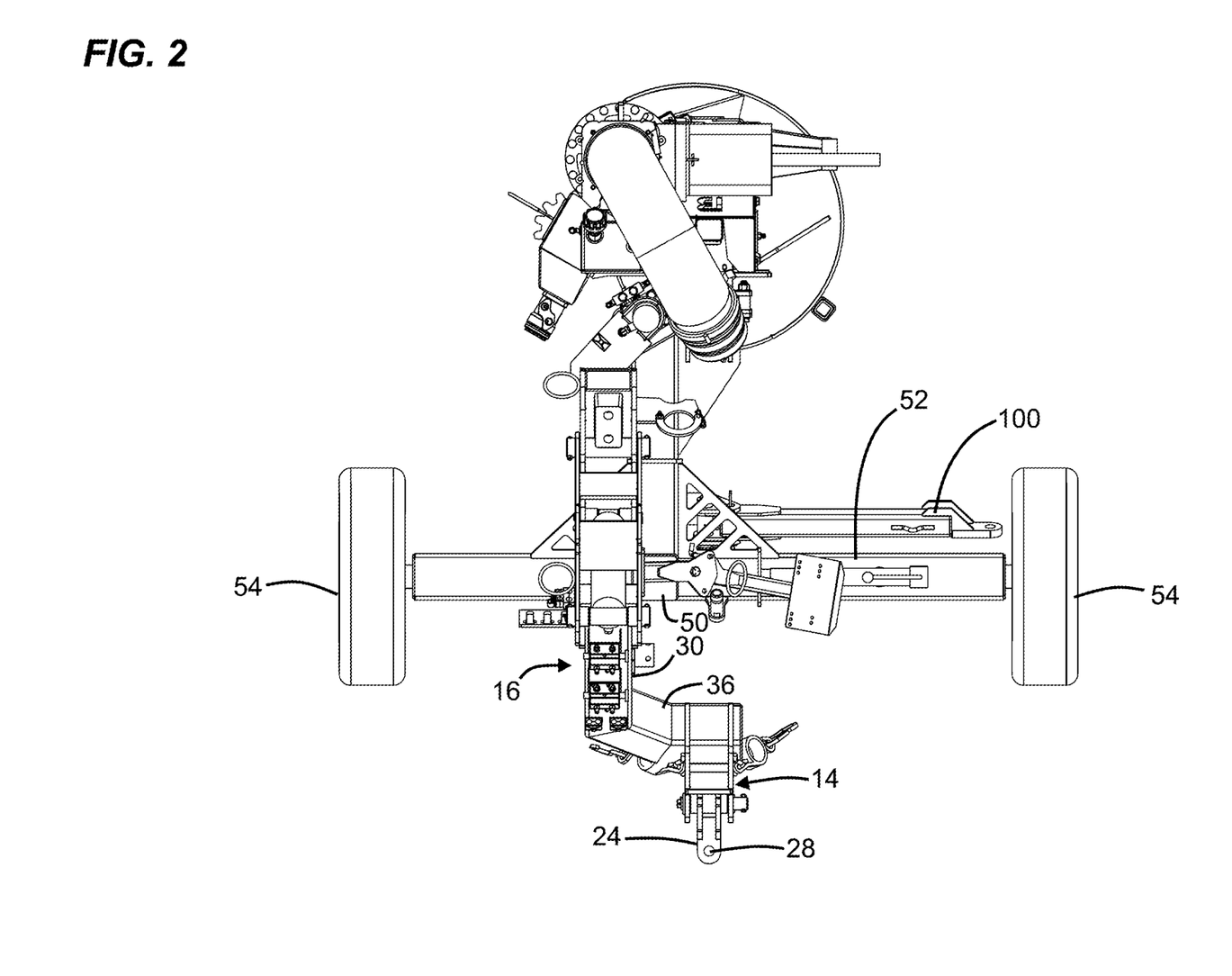
FIG. 2 shows another view of the example trailer of FIG. 1.

In operation, during transport, the hydraulic cylinder 40 is extended which causes the first member 30 and the second member 32 of the tongue to be in an unfolded position (or transport mode), as shown in FIGS. 1 and 2. As a result, the pump 12 is in an angled position which permits a shorter length for the trailer during transport. The shorter length also decreases the storage area required when not in use.

At the pumping site, the trailer is backed up to the pit. Again, due to the shorter length, the tractor is closer to the pump, making it easier for the tractor operator to see the pump while inserting and removing the pump from the pit, and allowing the pump to be used in more confined areas that exist at some pump sites. Once in position, the hydraulic cylinder 40 is retracted, which draws the cylinder support member 42 forwardly.

Figure 3:
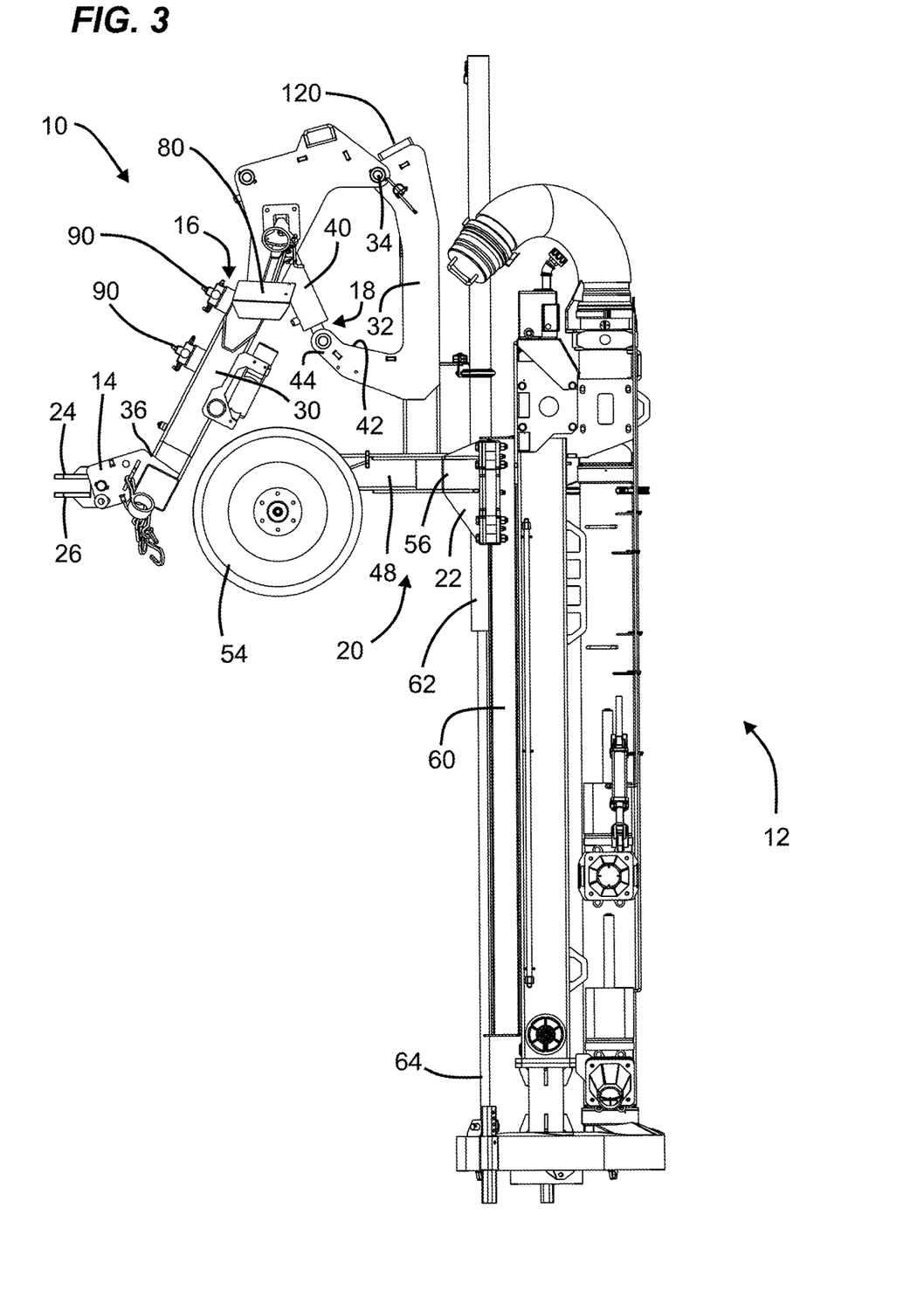
FIG. 3 shows another view of the example trailer of FIG. 1 in an operating mode with the manure pump in a lowered position for pumping.
Figure 4:
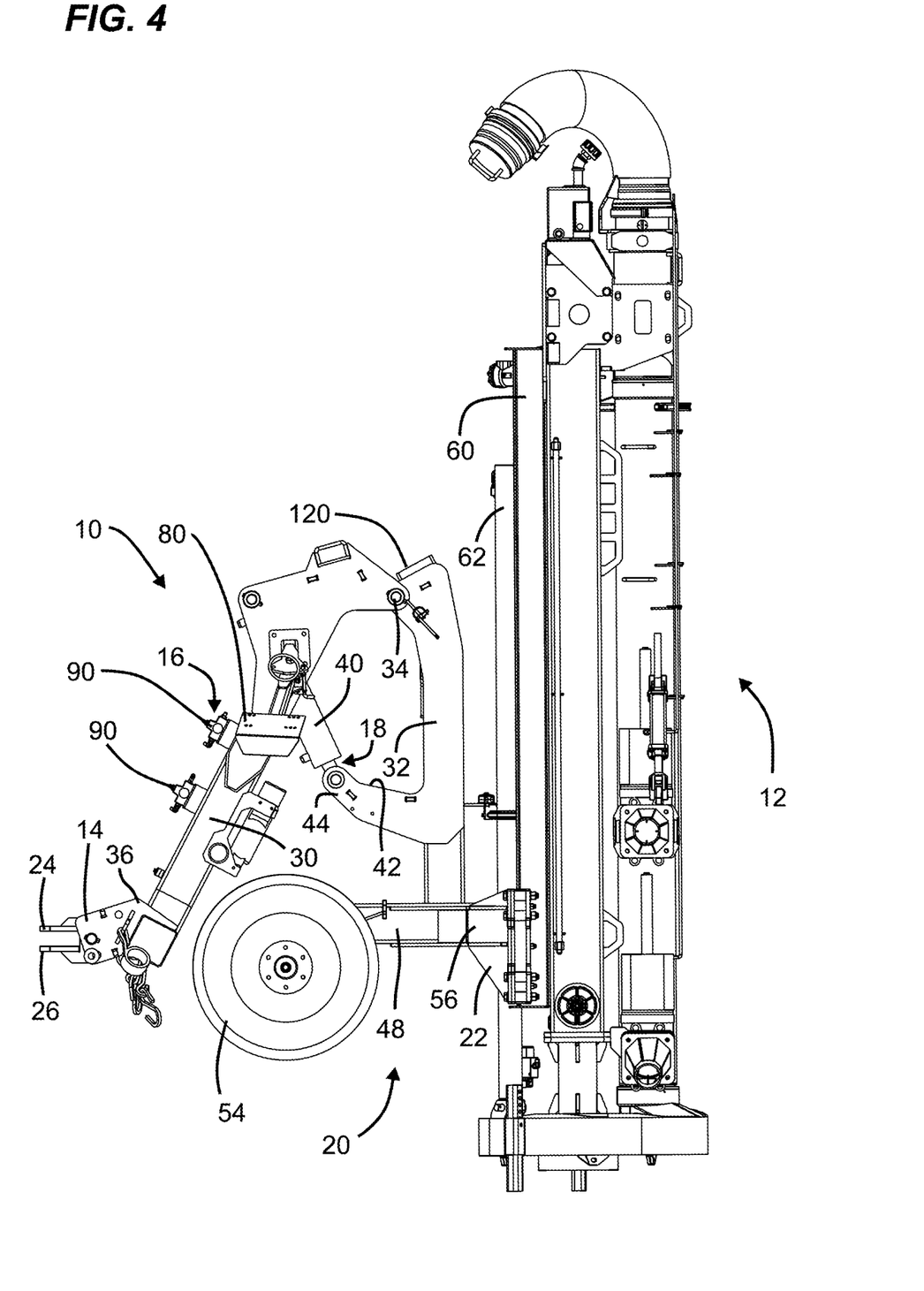
FIG. 4 shows another view of the example trailer of FIG. 3 with the manure pump in a lifted position.

The ground support system 20 is also drawn forward, which causes the second member 32 of the tongue to pivot in relation to the first member 30 from an angled position to an upright position. As the second member 32 moves to an upright position, the pump 12 follows to a lifted position (or operating mode) above and into the manure pit, as shown in FIG. 4. This can be accompanied, for instance, by the pulling vehicle backing up as the pump 12 moves to the operating mode. This reduces the horizontal distance between the pump and the hitch. Once positioned over the pit, hydraulic cylinder 62 is activated and extends downwardly causing the upright vertical I-beam 60 and pump 12 to slide downwardly through the guide member 22 and into the pit, as shown in FIG. 3.

There are also many variations to the trailer 10. For instance, the operating mode can include positioning the pump 12 at various angles relative to horizontal, such as 90 degrees (i.e., vertical), 85 degrees, 45 degrees, etc. depending on the terrain and operating environment.

For instance, the trailer 10 could also be designed with a single centered tongue with a passage for the PTO shaft or a tongue on each side of center instead of the offset tongue. Many other configurations are possible.

The folding caused by the cylinder 40 could also be achieved utilizing different hydraulic, pneumatic, mechanical, or electrical systems. As noted, the first member 30 and the second member 32 could also be positioned at a variety of angles relative to one another, for instance at an angle equal to or less than forty-five degrees relative to one another while in the transport mode. The guide member 22 could also be replaced with rollers or other translation mechanisms.

Figure 6:
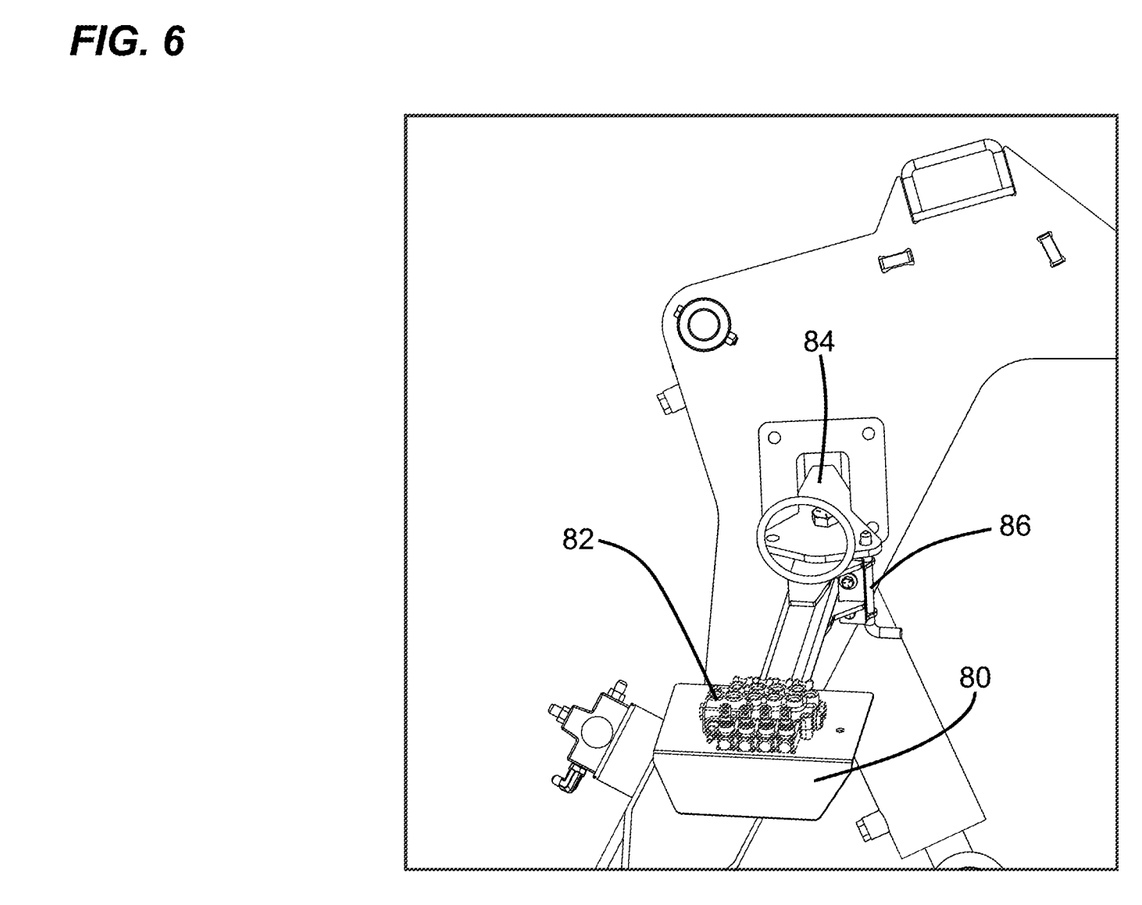
FIG. 6 shows an example stand for controls for the trailer of FIG. 1.

In alternative examples, the trailer 10 can have upgradable options that include extra hydraulic functionality. For trailers that have hydraulic controls during pump operation, the hydraulic controls 82 can be mounted on the trailer body or the pump body. The controls 82 can be mounted on a stand 80 that bolts to the tongue. See FIGS. 1 and 6. The stand 80 pivots on an arm 84 so that the controls 82 can be rotated out of the way when attaching or removing the PTO shaft. The stand 80 is secured in the stowed position and work position with a spring-loaded pin 86 to easily switch between locations.

The hoses for the hydraulic controls can run from a valve bank along the tongue to the pump body. The hoses meet the pump body at a point where the distance from the valve bank is nearly the same when the pump body is in the travel position as it is when the pump body is in the working position.

Figure 7:
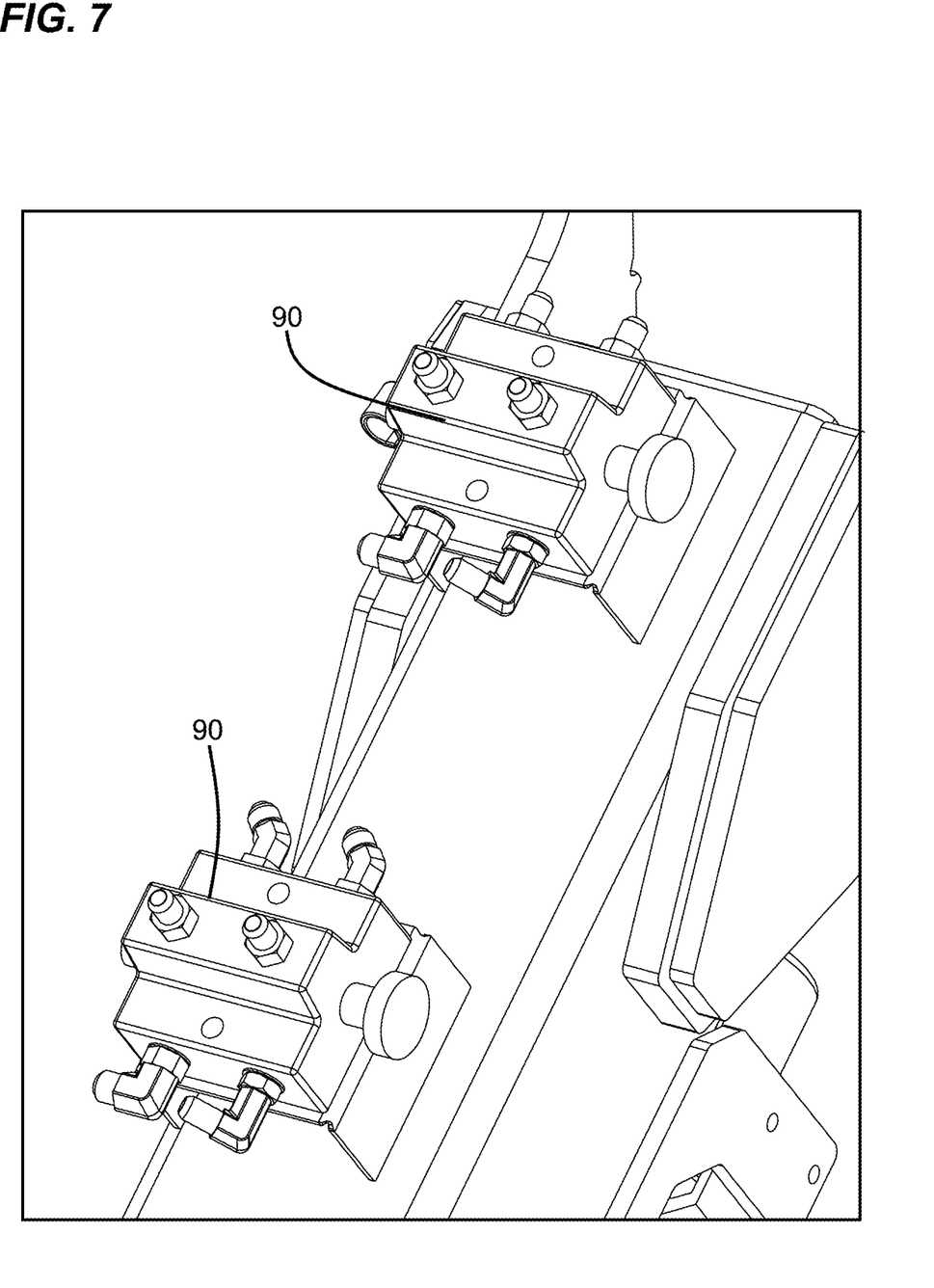
FIG. 7 shows an example double selector valve of the trailer of FIG. 1.

The valve bank controls are supplied hydraulic fluid by a manual double selector valve 90 near the front of the trailer body, as shown in FIGS. 1 and 7. The double selector valve 90 has hoses that connect to a tractor to supply flow to the hydraulic system. The selector valves 90 reduce the number of hoses that need to be plugged into the tractor.

Figure 8:
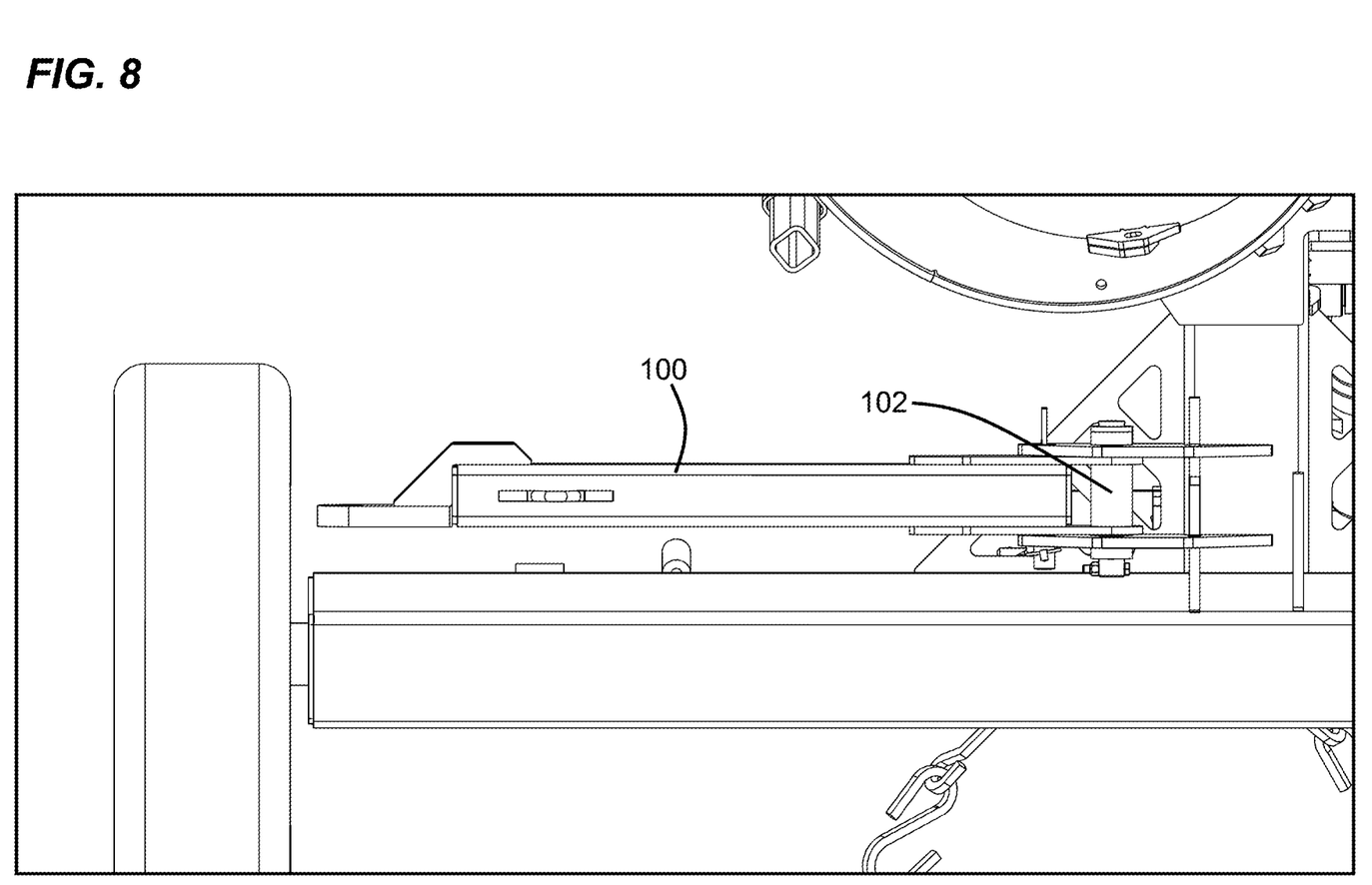
FIG. 8 shows an example rear hitch of the trailer of FIG. 1.

In alternative examples, the trailer can optionally include a rear hitch 100, as shown in FIGS. 2 and 8. The rear hitch 100 pivots about an axis 102 to be in line with the axle when the pump 12 is in operating mode (as shown in FIGS. 2 and 8). When in transport mode, the hitch 100 can be pivoted to be at or near perpendicular with the axle. A second trailer pump or a loadstand pipe can be pulled behind the trailer between sites. This pivoting hitch 100 can be advantageous because it locates the hitch and/or the second implement at a more standard towing height. Other rear hitch options can require the operator to either lift a very heavy pump hitch up to meet the rear hitch on the bottom of the pump housing or maneuver the pump down to the necessary height to attach the second pump. The rear hitch utilizes a set of pins to lock it into the transport and operating modes.

Figure 9:
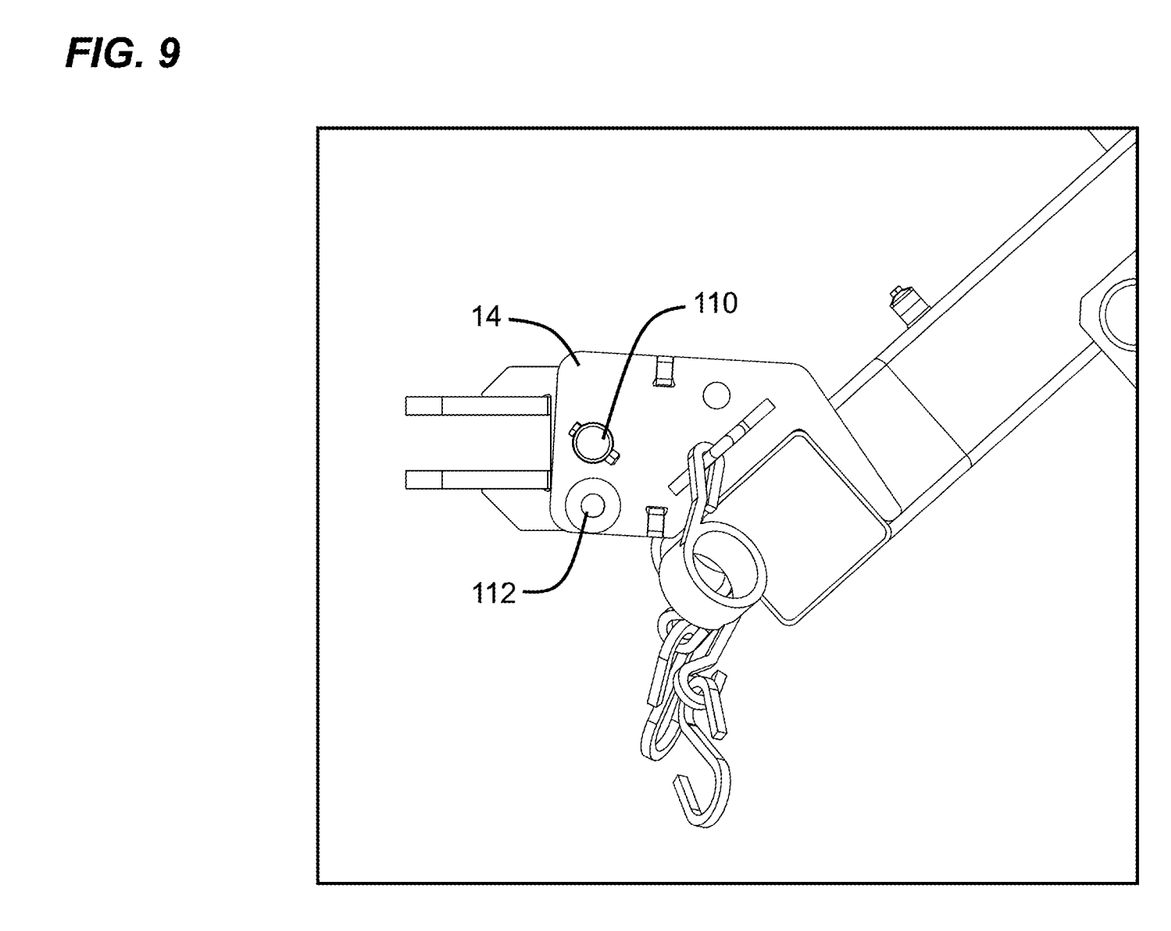
FIG. 9 shows an example pivoting hitch of the trailer of FIG. 1.

In some examples, the hitch 14 pivots about an axis 110 when a pin 112 is removed, as shown in FIGS. 1 and 9. The pivoting hitch 14 can be important to extend the life of the hitch 14. The folding motion causes the tongue to angle up around 20 degrees when switching from transport to operating mode. The pivoting hitch 14 reduces the force on the hitch and keeps the top of the hitch from digging into the drawbar. A nonpivoting hitch could cause the top of the trailer hitch to bend up.

Figure 10:
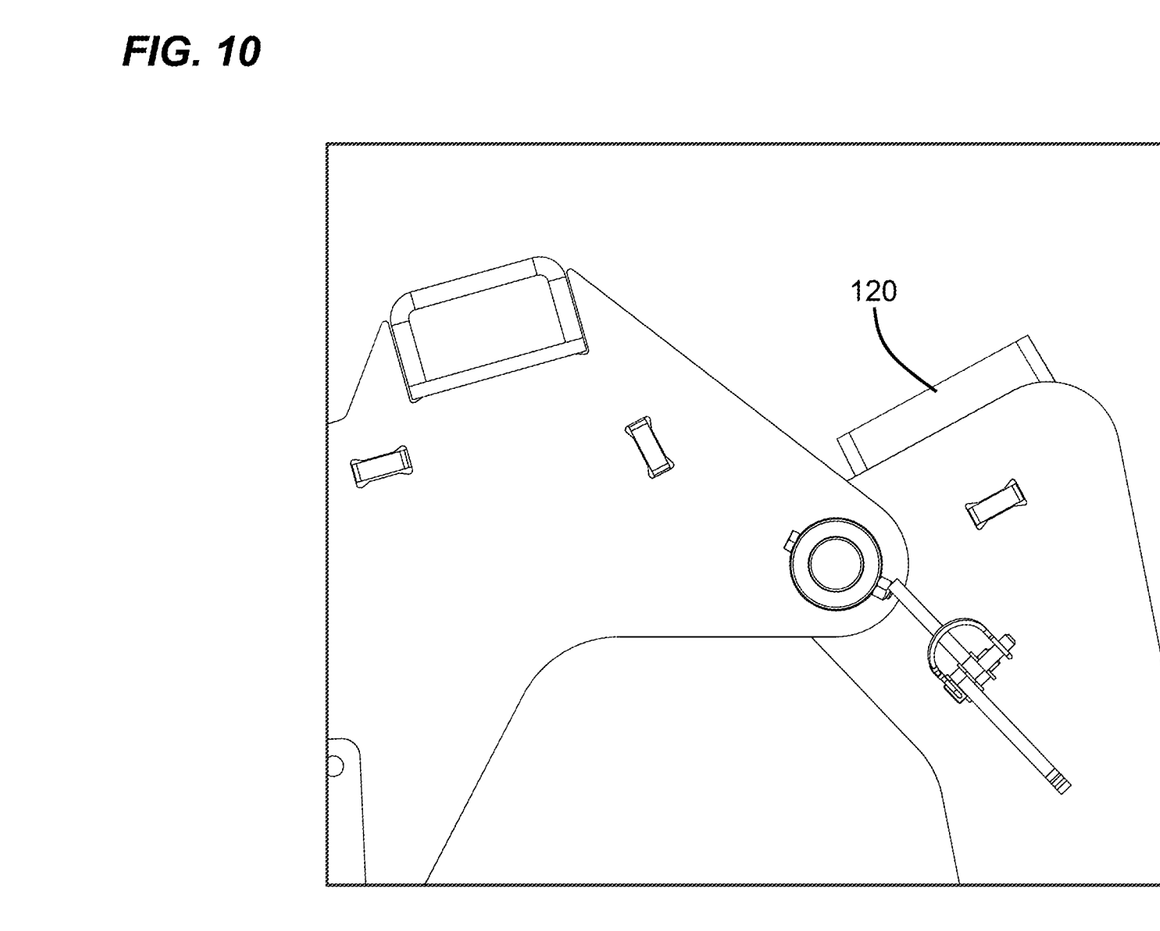
FIG. 10 shows an example damper block of the trailer of FIG. 1.

In some examples, a block 120 is provided on the trailer body that meets the tongue in travel mode, as shown in FIGS. 3 and 10. The block 120, which can be made of a plastic material like rubber, acts as a dampener in transport mode and reduces the high impact forces on the fold cylinder due to uneven roads or worksites. This can be used in place of a hard stop or relying solely on the cylinder to keep the folding mechanism in place during transport. The rubber block 120 helps share the loads and decrease the force that would otherwise route entirely through the cylinder and provides redundant safety when traveling down the road.

Figure 11:
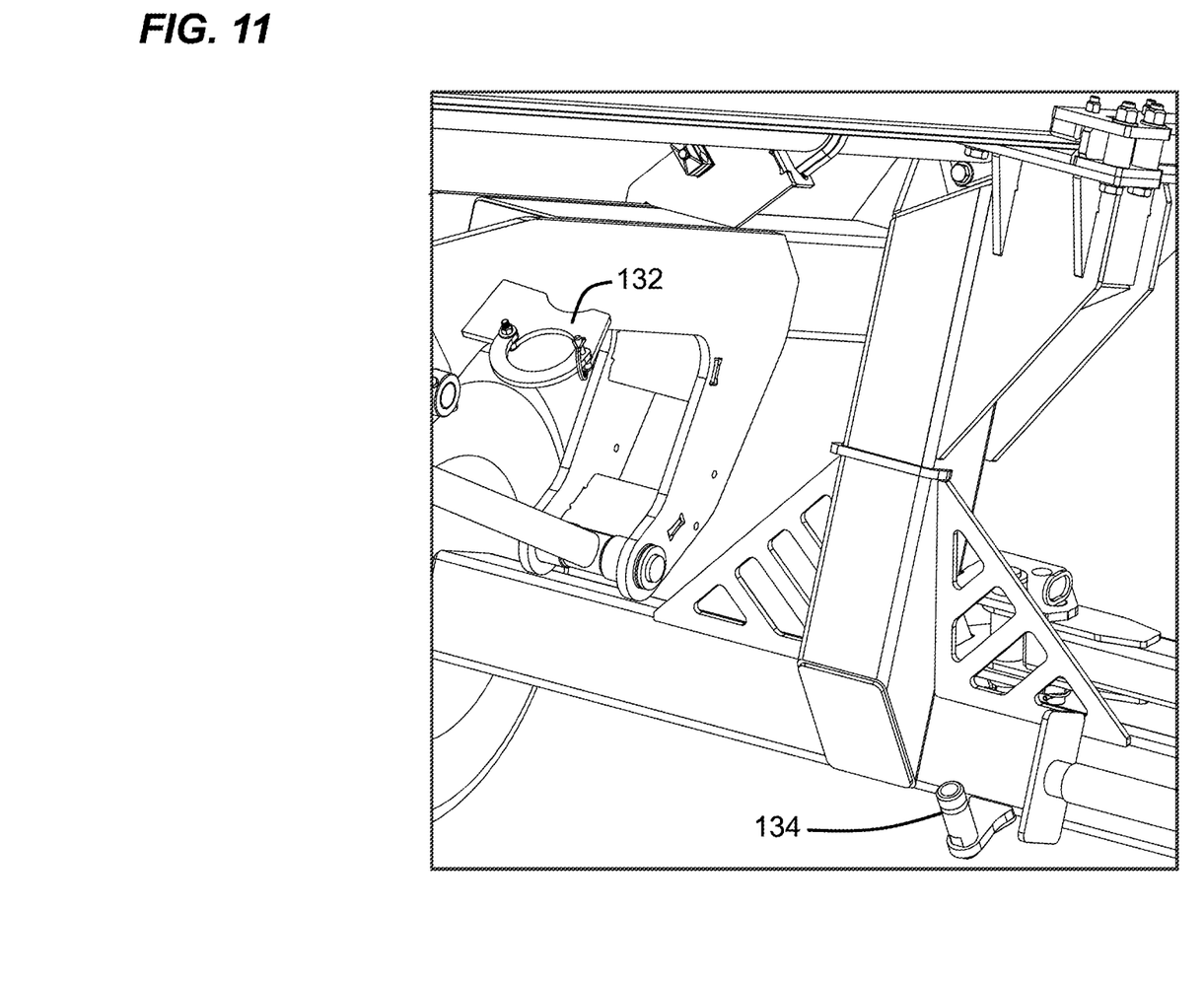
FIG. 11 shows an example shaft storage location of the trailer of FIG. 1.

In some embodiments, the trailer also has integrated PTO shaft storage. A positive engagement storage pin 134 provides a secure mounting location for the PTO shaft. The storage pin has a groove that engages the ball lock on the PTO shaft, as shown in FIG. 11. The upper mount to support the shaft is a cradle with a loop 132 over the top. The top loop 132 is pinned on one side and bolted on the other to provide a secure lock during travel with easy access for the operator.

The folding mechanism is achieved in the example shown with a hydraulic cylinder. However, in alternative embodiments, this mechanism could be achieved with numerous other systems, such as an electric motor, a hydraulic motor, a manual crank, or other power systems.

In alternative embodiments, the pump could be operated by other mechanisms besides the PTO. For instance, the pump could be driven from a standalone engine and PTO, a hydraulic system with any power source, electric motors, pneumatics, etc. In yet other embodiments, a portion of all of the functionality described herein could be operated by radio remote control or telematics for off-site remote control. Many configurations are possible.

It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A trailer for a pump, the trailer comprising:
    a folding system including a first member and a second member that are pivotally connected to one another at a pivot point;
    a mechanism positioned to move the first member relative to the second member from a transport mode to an operating mode;
    a ground support system configured to support the trailer relative to a ground;
    a guide member configured to hold the pump, wherein, in the operating mode, the guide member holds the pump in a vertical position relative to the ground, and wherein the guide member is configured to allow the pump to move relative to the guide member between a lifted position and a lowered position for pumping; and
    a second hydraulic cylinder positioned to move the pump from the lifted position to the lowered position.

2. The trailer of claim 1, wherein the pump is a manure agitator pump.

3. The trailer of claim 1, wherein the mechanism is a hydraulic cylinder.

4. The trailer of claim 3, wherein the hydraulic cylinder includes a first end and a second end, wherein the first end is coupled to the first member and the second end is coupled to a cylinder support member.

5. The trailer of claim 4, wherein the hydraulic cylinder is configured to move from an extended position to a retracted position.

6. The trailer of claim 5, wherein as the hydraulic cylinder moves from the extended position to the retracted position, the second member pivots about the pivot point relative to the first member.

7. The trailer of claim 5, wherein the extended position defines the transport mode, and the retracted position defines the operating mode.

8. A method for trailering a pump, the method comprising:
    providing a first member and a second member that are pivotally connected to one another at a pivot point;
    providing a mechanism for moving the first member relative to the second member from a transport mode to an operating mode;
    providing a ground support system configured to support a trailer relative to a ground;
    providing a guide member configured to hold the pump, wherein, in the operating mode, the guide member holds the pump in a vertical position relative to the ground, and wherein the guide member is configured to allow the pump to move relative to the guide member between a lifted position and a lowered position for pumping; and
    providing a second hydraulic cylinder positioned to move the pump from the lifted position to the lowered position.

9. The method of claim 8, wherein the pump is a manure agitator pump.

10. The method of claim 8, wherein the mechanism is a hydraulic cylinder.

11. The method of claim 10, wherein the hydraulic cylinder includes a first end and a second end, wherein the first end is coupled to the first member and the second end is coupled to a cylinder support member.

12. The method of claim 11, wherein the hydraulic cylinder is configured to move from an extended position to a retracted position.

13. The method of claim 12, wherein as the hydraulic cylinder moves from the extended position to the retracted position, the second member pivots about the pivot point relative to the first member.

14. The method of claim 12, wherein the extended position defines the transport mode, and the retracted position defines the operating mode.

* * * * *